United States Patent
McCann et al.

(10) Patent No.: US 10,127,417 B2
(45) Date of Patent: Nov. 13, 2018

(54) SYSTEMS AND METHODS FOR DETERMINING INTERACTION STATES OF WIRELESS TAGS BASED ON PROBABILITY DISTRIBUTIONS

(71) Applicant: Disney Enterprises, Inc., Burbank, CA (US)

(72) Inventors: James McCann, Pittsburgh, PA (US); Andrew Spielberg, Boston, MA (US); Scott Hudson, Pittsburgh, PA (US); Alanson Sample, Pittsburgh, PA (US); Jennifer Mankoff, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/132,169

(22) Filed: Apr. 18, 2016

(65) Prior Publication Data
US 2017/0200031 A1    Jul. 13, 2017

Related U.S. Application Data

(60) Provisional application No. 62/276,608, filed on Jan. 8, 2016.

(51) Int. Cl.
*G06K 7/10*    (2006.01)
*G06F 17/30*    (2006.01)
(Continued)

(52) U.S. Cl.
CPC .... *G06K 7/10366* (2013.01); *G06F 17/30811* (2013.01); *G06K 7/10316* (2013.01);
(Continued)

(58) Field of Classification Search
CPC ............ G06K 19/0723; G06K 7/0095; G06K 7/10029; G06K 9/00771; G06K 9/3241; G06K 7/0008; G06K 7/10039; G06K 7/10059; G06K 7/10366; G06K 7/10356; G06K 19/07; G06K 7/1036; G06K 7/10396; G06K 7/10316; G06K 7/10376; G06T 7/20; G06T 2207/20076; H04N 7/181; H04N 21/4223; G01S 13/878; G06F 17/30811; G06F 1/163; G06Q 10/087;
(Continued)

(56) References Cited

U.S. PATENT DOCUMENTS

| 7,076,441 | B2 | 7/2006 | Hind |
| 2005/0270158 | A1 | 12/2005 | Corbett |

(Continued)

*Primary Examiner* — Dionne H Pendleton
(74) *Attorney, Agent, or Firm* — Farjami & Farjami LLP

(57) ABSTRACT

There is provided a system including a wireless tag reader, a wireless tag attached to an object, a non-transitory memory storing an executable code, and a hardware processor executing the executable code to transmit, using the wireless tag reader, an interrogation signal, receive, using the wireless tag reader, a tag signal from the wireless tag attached to the object, in response to the interrogation signal, the tag signal including a wireless tag identification uniquely identifying the wireless tag, determine a tag state associated with the wireless tag using a probabilistic estimate based on the tag signal received from the wireless tag, and determine an interaction state of the object based on the tag state of the wireless tag attached to the object.

19 Claims, 12 Drawing Sheets

(51) Int. Cl.
*G06Q 10/08* (2012.01)
*H04N 21/4223* (2011.01)

(52) U.S. Cl.
CPC ..... *G06K 7/10356* (2013.01); *G06K 7/10376* (2013.01); *G06K 7/10396* (2013.01); *G06Q 10/087* (2013.01); *H04N 21/4223* (2013.01)

(58) Field of Classification Search
CPC ............ G06Q 30/0645; G08B 13/2445; G08B 21/18; H04R 2201/023; H04R 5/023; A41D 1/005
See application file for complete search history.

(56) References Cited

U.S. PATENT DOCUMENTS

| | | | |
|---|---|---|---|
| 2007/0241965 | A1 | 10/2007 | Kolavennu |
| 2009/0072029 | A1 | 3/2009 | Martin |
| 2010/0039228 | A1* | 2/2010 | Sadr .......................... G01S 5/12 340/10.1 |
| 2012/0169500 | A1 | 7/2012 | Stern |
| 2013/0249736 | A1 | 9/2013 | Nikitin |
| 2014/0002663 | A1 | 1/2014 | Garland |
| 2014/0167920 | A1 | 6/2014 | Kamiya |
| 2015/0019161 | A1 | 1/2015 | Moriguchi |
| 2015/0145671 | A1* | 5/2015 | Cohen .................... G08B 21/18 340/539.11 |
| 2016/0328638 | A1* | 11/2016 | Elsaid Ibrahim .... G06K 7/0095 |
| 2016/0379074 | A1* | 12/2016 | Nielsen ................ G06K 9/3241 348/143 |
| 2017/0069106 | A1* | 3/2017 | Ikoma .................. G06K 9/4671 |
| 2017/0136265 | A1 | 5/2017 | Hyde |

* cited by examiner

SYSTEMS AND METHODS FOR DETERMINING INTERACTION STATES OF WIRELESS TAGS BASED ON PROBABILITY DISTRIBUTIONS

RELATED APPLICATION(S)

The present application claims the benefit of and priority to a U.S. Provisional Patent Application Ser. No. 62/276,608, filed Jan. 8, 2016, which is hereby incorporated by reference in its entirety into the present application.

BACKGROUND

Wireless tags are used for locating objects, such as a misplaced remote control or a misplaced set of keys. Such object location systems conventionally use radio frequency (RF) technology to determine a last known location of an item, for example, in a house or in a retail store. Some object location systems include a speaker allowing the user to trigger an audible sound enabling the user to find the item. However, the location accuracy of conventional systems is limited by the type of RF technology used. Additionally, the information attainable using conventional systems is limited by the location of the wireless tag or item.

SUMMARY

The present disclosure is directed to systems and methods for determining interaction states of wireless tags based on probability distributions, substantially as shown in and/or described in connection with at least one of the figures, as set forth more completely in the claims.

DETAILED DESCRIPTION

Figure 1:
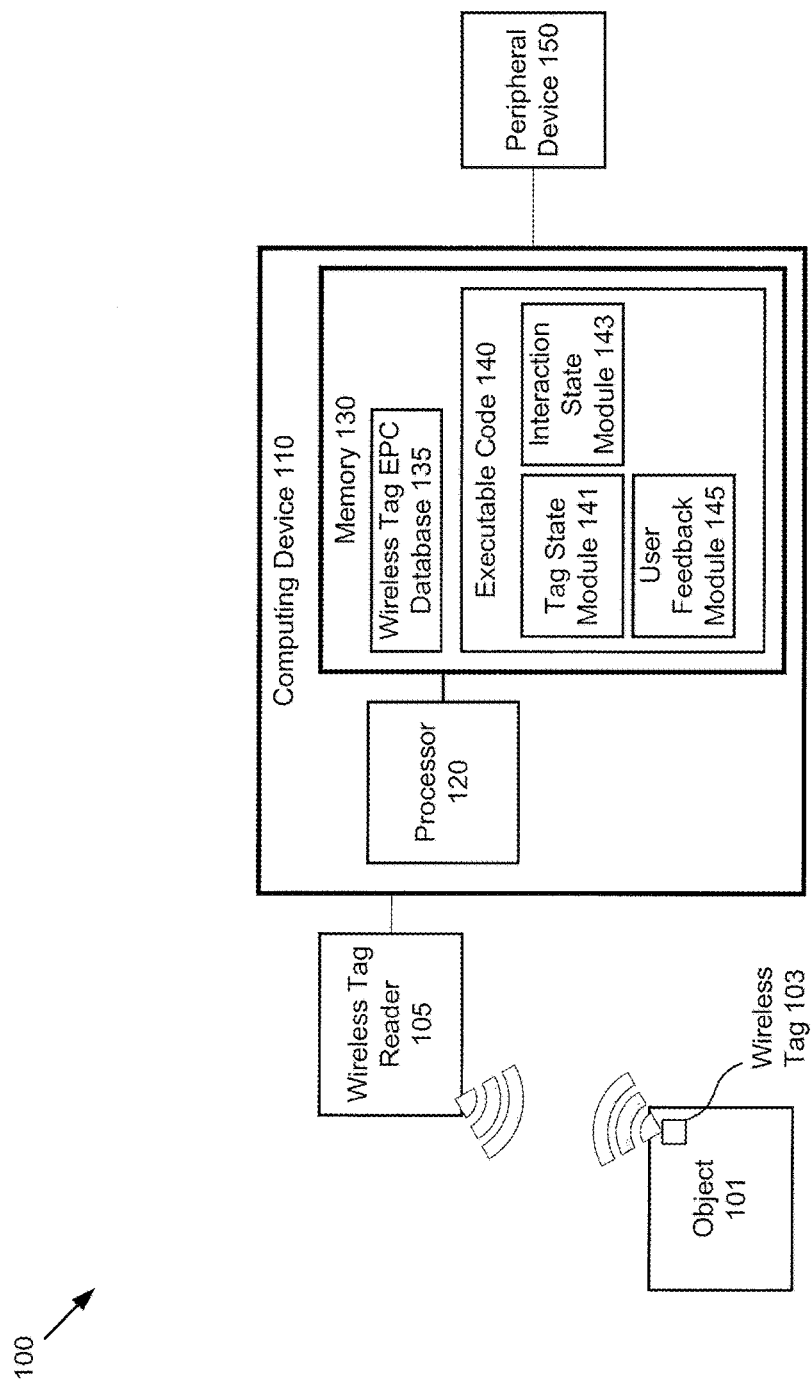
FIG. 1 shows a diagram of an exemplary system for determining interaction states of wireless tags based on probability distributions, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for determining interaction states of wireless tags based on probability distributions, according to one implementation of the present disclosure. System 100 includes object 101 including wireless tag 103, wireless tag reader 105, computing device 110, and peripheral device 150. Computing device 110 includes processor 120 and memory 130. Processor 120 is a hardware processor, such as a central processing unit (CPU) used in computing devices. Memory 130 is a non-transitory storage device for storing computer code for execution by processor 120, and also storing various data and parameters. Memory 130 includes wireless tag EPC (electronic product code) database 135 and executable code 140.

Object 101 may be any moveable item with which a human can interact and may comprise a plurality of physical objects. In some implementations, object 101 may be a household object, a toy, a game having a game board and a plurality of pieces, etc. In some implementations, wireless tag 103 may be integrated with object 101, such as when wireless tag 103 is included during manufacturing of object 101, or wireless tag 103 may be adhered or attached to object 101, such as when wireless tag 103 is attached to object 101 using an adhesive.

Wireless tag 103 includes electronic circuitry that is packaged and contains electronically stored information. Wireless tag 103 may be attached or adhered to object 101 for identifying object 101 based on the electronically stored information in wireless tag 103. Wireless tag 103 may be an active wireless tag, a battery-assisted passive wireless tag, or a passive wireless tag. In some implementations, wireless tag 103 may be a radio frequency identification (RFID) tag, an ultra high frequency (UHF) RFID tag, a near field communication (NFC) transmitter, or a short distance radio transmitter. Short distance radio transmissions may operate in the unlicensed industrial, scientific and medical (ISM) band at 2.4-2.485 GHz using a spread spectrum, frequency hopping, full-duplex signal at a nominal rate of 1600 hops/sec. In some implementations, wireless tag 103 may be a BLUETOOTH® (BT) transmitter or a BT low energy (BLE) transmitter, where BLE transmitters include, among other things, BLUETOOTH® Smart and iBEACON™ transmitters. Wireless tag 103 may be a wireless device especially suited to be adhered to an object made of a certain material, such as a wireless tag designed for use with a glass object or a wireless tag designed for use with a metal object. Wireless tag 103 may include a unique EPC that may be transmitted to or read by wireless tag reader 105 and may uniquely identify wireless tag 103.

Wireless tag reader 105 may be a wireless device having a wireless receiver coupled to an antenna for reading or obtaining information from wireless tags, such as an RFID reader, a UHF RFID reader, an NFC antenna, at BT or BLE antenna, etc. An RFID reader includes a radio frequency transmitter and receiver, which is able to read RFID tags. In some implementations, wireless tag reader 105 may read passive or active wireless tags. Wireless tag reader 105 may transmit interrogator signals and receive authentication replies from a plurality of wireless tags, such as wireless tag 103. Wireless tag reader 105 may be used to monitor and/or track a plurality of wireless tags in a room, building or any other environment, and may communicate with a plurality of wireless tags using a communication channel, or wireless tag reader 105 may communicate with each wireless tag via a communication channel corresponding to each wireless tag. Each communication channel has its own particular characteristics and impairments. In some implementations, wireless tag reader 105 may detect wireless channel parameters, such as Received Signal Strength Indicator (RSSI), RF phase, and Doppler shift of wireless tag 103.

Wireless tag EPC database 135 is a database stored in memory 130 and may include a plurality of wireless tag EPCs each corresponding to a wireless tag, such as wireless tag 103. In some implementations, one or more of the wireless tag EPCs in wireless tag EPC database 135 may be associated with additional information, such as a video or an audio track. In other implementations, wireless tag EPC database may associate one or more wireless tag EPCs with a category of items, for example, as a category of game piece, such as Xs, Os, and game board slots for playing Tick-tac-toe, or as red pieces or black pieces for playing checkers. Wireless tag EPC database 135 may associate one or more wireless tag EPCs with a specific item, such as specific game pieces for playing chess, etc.

Executable code 140 includes one or more software modules stored in memory 130 for execution by processor 120 of computing device 110. In some implementations, executable code 140 may be a real-time data acquisition and classification program. For example, executable code 140 may observe changes in the physical layer signals of the communication channel between wireless tag reader 105 and wireless tag 103, such as an RSSI, an RF phase, and a Doppler shift of wireless tag 103. The physical layer is the first layer of the Open System Interconnection Model (OSI Model). The physical layer defines the means of transmitting raw bits between wireless tag 103 and wireless tag reader 105. Executable code 140 may use changes in the physical layer signals of the communication channel between the RFID reader and wireless tag 103 to determine changes in a position and/or orientation of object 101, to determine when wireless tag 103 is uncovered or covered, or to infer a human interaction with object 101, etc. As shown in FIG. 1, executable code 140 includes tag state module 141, interaction state module 143, and user feedback module 145.

Tag state module 141 is a software module stored in memory 130 for execution by processor 120 to estimate a tag state of wireless tag 103. In some implementations, tag state module 141 may estimate the tag state of wireless tag 103 based on previous tag states of wireless tag 103 and/or an input received from wireless tag reader 105. Tag state module 141 may interpret a signal received from wireless tag 103 in estimating the tag state of wireless tag 103, and tag state module 141 may interpret a lack of a signal received from wireless tag 103 in estimating the tag state of wireless tag 103. For example, when wireless tag 103 is uncovered, e.g., there is no object directly covering wireless tag 103 or in between wireless tag 103 and wireless tag reader 105 substantially obstructing the interrogation signal transmitted by wireless tag reader 105, wireless tag 103 may respond to the interrogation signal transmitted by wireless tag reader 105 at a higher rate than when an object is covering wireless tag 103 or substantially obstructing the path of the interrogation signal between wireless tag 103 and wireless tag reader 105. Tag state module 141 may user the RSSI and/or tag read-rate of wireless tag 103 to determine the covered or uncovered state of wireless tag 103. Tag state module 141 may determine a motion state of wireless tag 103 based on one or more wireless channel parameters corresponding to wireless tag 103. For example, tag state module 141 may determine that wireless tag 103 is in motion, or not in motion, based on the RF phase and/or the Doppler shift of the authentication signal received from wireless tag 103.

Based on the current tag state of wireless tag 103 and the previous tag states of wireless tag 103, tag state module 141 may create a probability distribution for wireless tag 103. Using the probability distribution of wireless tag 103, tag state module 141 may determine that wireless tag 103 is most likely in a certain tag state, e.g., covered, uncovered, still, moving, etc. In some implementations, tag state module 141 may rely on corresponding interactions between one or more wireless tags and a corresponding number of tag covers to identify correlated appearance and/or disappearance of the wireless tags to keep track of which game pieces have been placed into which game slots.

Interaction state module 143 may determine an interaction state of wireless tag 103 based on a probability distribution of possible interaction states. Interaction states of wireless tag 103 may describe a current state of object 101 and/or wireless tag 103. Interaction states for games may include that a game piece has not been played, is currently being played, has already been played, and may include information about how a game piece was played, e.g., the play slot in which an X or O was played in a game of Tick-tac-toe. In some implementations, interaction states may be defined by an application that is created by an application developer, and interaction state module 143 may receive the definition of one or more interaction states from a downstream application. In some implementations, interaction state module 143 may use the previous and current tag states of wireless tag 103, along with previous interaction states of wireless tag 103, to probabilistically update the interaction state of wireless tag 103.

User feedback module 145 may provide user feedback based on the interaction state of wireless tag 103. In some implementations, user feedback module 145 may display a graphic corresponding to the interaction state of wireless tag 103 on a display, or user feedback module 145 may play an audio related to the interaction state of wireless tag 103 on a speaker. Peripheral device 150 may include a display and/or a speaker used to provide feedback to a user. In some implementations, peripheral device 150 may provide visual feedback, such as by displaying a game on a display. Peripheral device 150 may also provide audio feedback. For example, user feedback module 145 may play an audio using peripheral device 150 to indicate the beginning of a game, to communicate the beginning and/or end of a user's turn in a game, and/or to communicate the end of a game, either when a user wins, or the game has ended in a draw where no player wins and no further plays are available.

Figure 2:
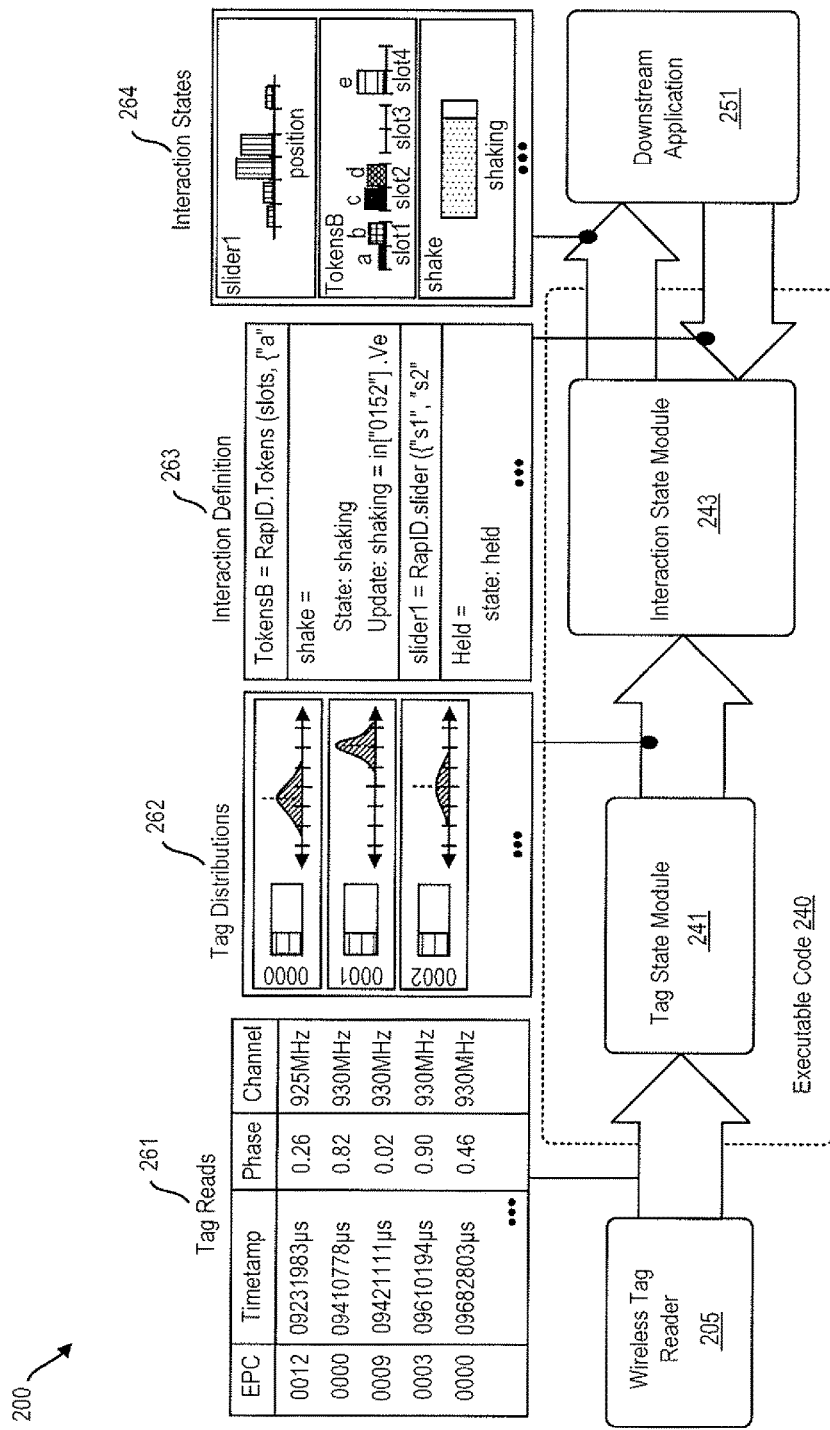
FIG. 2 shows a diagram of an exemplary process for detecting a user interaction with an object using wireless tags, according to one implementation of the present disclosure.

FIG. 2 shows a diagram of an exemplary process for detecting a user interaction with an object using wireless tags, according to one implementation of the present disclosure. As shown in process 200, executable code 140 propagates uncertainty about wireless tag states to applications by maintaining probability distributions over tag velocity and the cover state of each wireless tag, and sampling from the probability distributions to update the state distributions of application-defined interactions. At 261, wireless tag reader 205 provides tag reads to executable code 240. As shown in the Tag Reads table of 261, wireless tag reader 205 provides information related to a plurality of tag reads to executable code 240, including a unique EPC, a timestamp, the phase of the reflected interrogation signal, and the channel on which the information was received.

At 262, tag state module 241 provides tag distributions for each wireless tag to interaction state module 243. In some implementations, tag state module 241 may provide tag information corresponding to each wireless tag including a current tag state and a plurality of previous tag states. The current tag state together with the previous tag states may form a tag distribution for each wireless tag, which tag state module 241 may use to probabilistically determine a tag state for each wireless tag.

At 263, interaction state module 243 receives interaction definitions from downstream application 251. In some implementations, interaction definitions may be characterized by one or more attributes of wireless tag 103. For example, an interaction may be defined by a motion state of wireless tag 103 that is characterized by a change in phase of the signal received from wireless tag 103, a Doppler shift of the signal received from wireless tag 103, etc. In some implementations, the interaction definition may include a definition of when wireless tag 103 is uncovered or covered. The uncovered tag state may be defined by a number of tag reads per second determined by a response rate of wireless tag 103 to interrogation signals transmitted by wireless tag reader 105. Similarly, a tag covered state may be defined by a lack or responses to the interrogation signals transmitted by wireless tag reader 105.

At 264, interaction state module 243 transmits interaction states of each wireless tag to downstream application 251. In some implementations, the interaction state of each wireless tag may be based on one or more previous interaction states of each wireless tag and/or the tag distributions received from tag state module 241.

Figure 3:
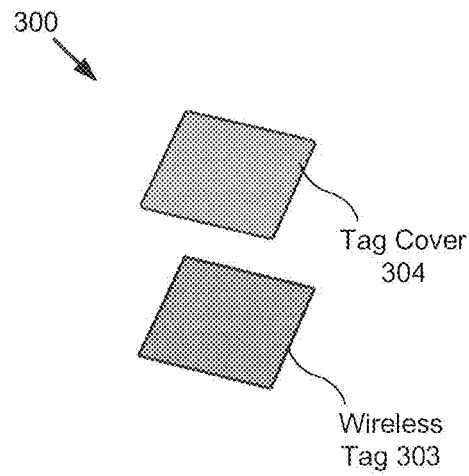
FIG. 3 shows a diagram of an exemplary wireless tag and tag cover for use with the system of FIG. 1, according to one implementation of the present disclosure.

FIG. 3 shows a diagram of an exemplary wireless tag and tag cover for use with the system of FIG. 1, according to one implementation of the present disclosure. Diagram 300 shows wireless tag 303 and tag cover 304. In some implementations, wireless tag 303 may be a passive RFID tag that may be attached or adhered to object 101. One of the key attributes of passive RFID systems is that the tags do not actively generate and transmit radio waves. Instead, wireless tag 103 may backscatter the carrier wave transmitted by wireless tag reader 105 back to wireless tag reader 105 in order to send data. This feature of the UHF RFID physical layer allows wireless tag reader 105 to measure the phase angle between the interrogation signal transmitted by wireless tag reader 105 and the reflected signal received from wireless tag 103 in a single read event.

Tag cover 304 may interfere with the interrogation signal transmitted to wireless tag 303 and/or the signal that is backscattered by wireless tag 303. In some implementations, tag cover 304 may be a conductor placed near wireless tag 303 to interfere with the interrogation signal, or tag cover 304 may be a dielectric element positioned to interfere with the interrogation signal and/or the back-scattered signal. A dielectric element may be an electromagnetic insulating element, such as a plastic cover, a hand of a user, etc.

Figure 4:
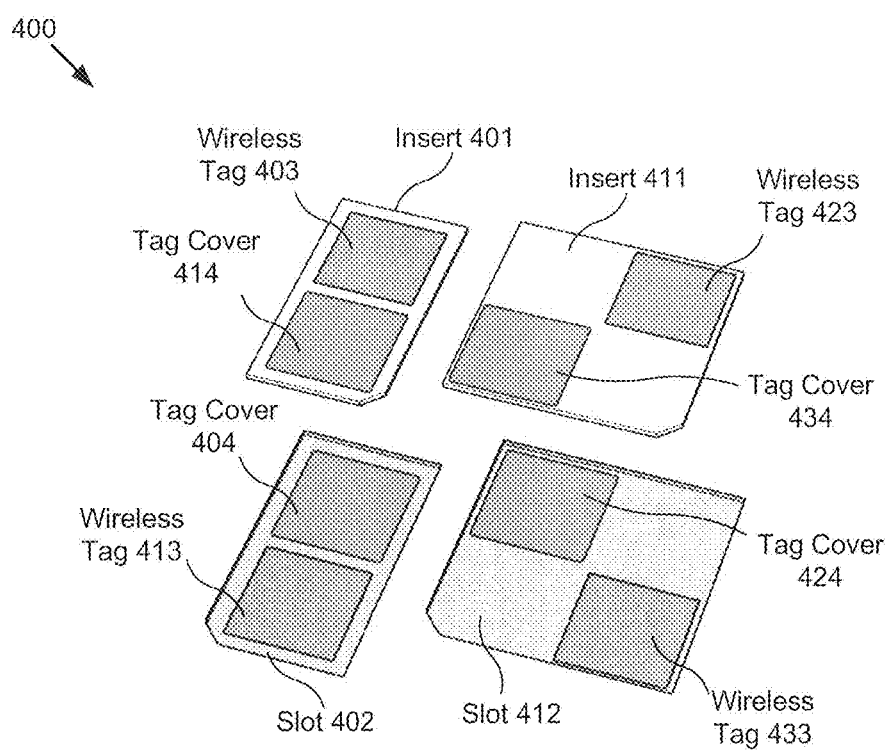
FIG. 4 shows a diagram of exemplary implementations of wireless tags and tag covers for use with the system of FIG. 1, according to one implementation of the present disclosure.

FIG. 4 shows a diagram of exemplary implementations of wireless tags and tag covers for use with the system of FIG. 1, according to one implementation of the present disclosure. Diagram 400 shows insert 401, slot 402, insert 411, and slot 412. Insert 401 includes wireless tag 403 and tag cover 414 and corresponds to slot 402 including tag cover 404 and wireless tag 413. Insert 401 and insert 411 may be game pieces for use in playing a game, inserts for selecting an option in a control system, etc. Slot 402 and slot 412 may be slots in a game board for receiving inserts as part of game play, slots in a control system for receiving inserts as control inputs, etc. For example, a game may be created using inserts to represent play pieces, such as Xs and Os used to play Tic-tac-toe, checker pieces for playing checkers, the various pieces in the game of chess, etc., and a corresponding game board with slots for receiving the game pieces. Inserts and slots may be configured so that the wireless tags and tag covers are properly aligned when insert 401 is inserted into slot 402 or insert 411 is inserted into slot 412, such as by trimming one corner of a rectangle so that the insert fits into the slot in only one orientation. Having only one possible configuration may ensure that tag cover 402 covers wireless tag 401 and tag cover 414 will cover wireless tag 413 when insert 401 is placed in slot 402. Similarly, tag cover 424 will cover wireless tag 423, and tag cover 434 will cover wireless tag 433 when insert 411 is placed in slot 412.

Figure 5:
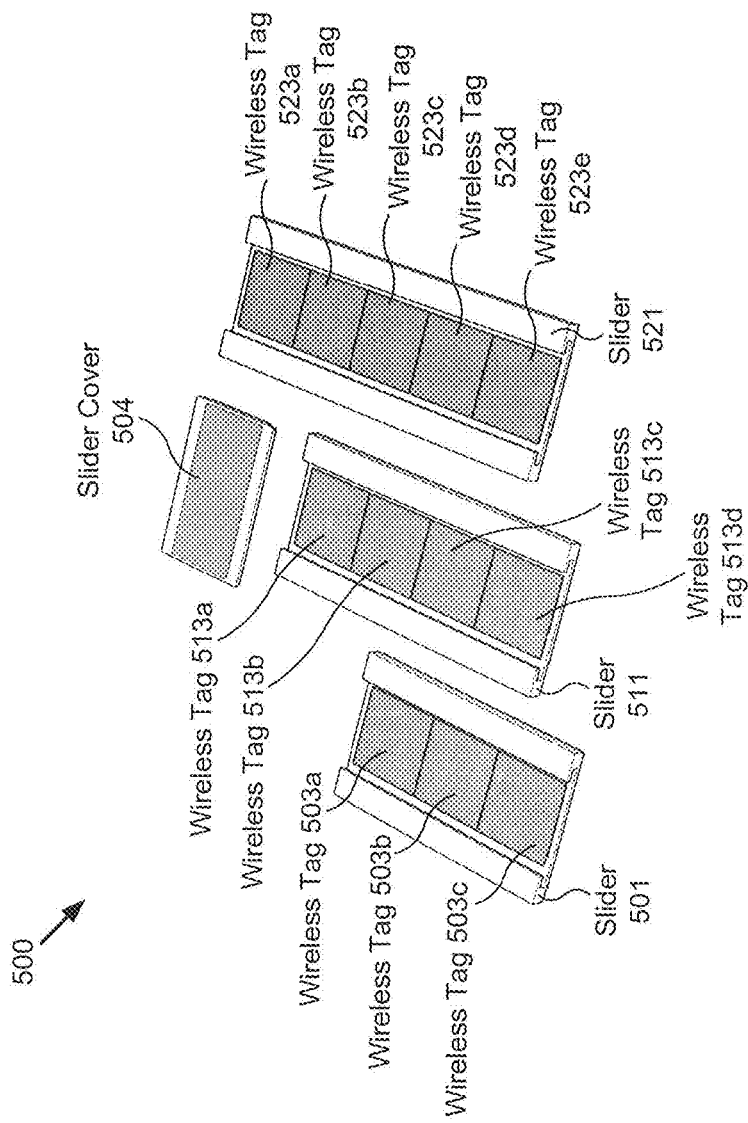
FIG. 5 shows a diagram of exemplary implementations of sliders including wireless tags and tag covers for use with the system of FIG. 1, according to one implementation of the present disclosure.

FIG. 5 shows a diagram of exemplary implementations of sliders including wireless tags and tag covers for use with the system of FIG. 1, according to one implementation of the present disclosure. Diagram 500 shows slider 501, slider 511, slider 521, and slider cover 504. Slider 504 may be user with a slider of any length and having any number of wireless tags. Slider 501 includes wireless tag 503a, wireless tag 503b, and wireless tag 503c. Slider 511 includes wireless tag 513a, wireless tag 513b, wireless tag 513c, and wireless tag 503d. Slider 521 includes wireless tag 523a, wireless tag 523b, wireless tag 523c, wireless tag 523 d, and wireless tag 523e. Slider 504 may be used to cover no wireless tag of a slider, e.g., when slider cover 504 is not placed on a slider, one wireless tag of a slider, or two adjacent wireless tags of a slider. A slider, such as slider 501, slider 511, or slider 521, may be useful for range-based inputs, such as a volume control. The number of slider inputs may be linear in the length of the slider. In some implementations, executable code 140 may estimate the slider state by looking for a single covered wireless tag or two adjacent covered tags. For example, slider 521 may be used as a volume control input. When slider cover 504 does not cover any of wireless tags 523a-523e, the volume may be set to zero, producing no audible output. Slider cover 504 may be inserted into an end of slider 521 and cover a first tag of slider 521, e.g., slider cover 504 is inserted into the end corresponding to wireless tag 523a and covers wireless tag 523a.

Figure 6:
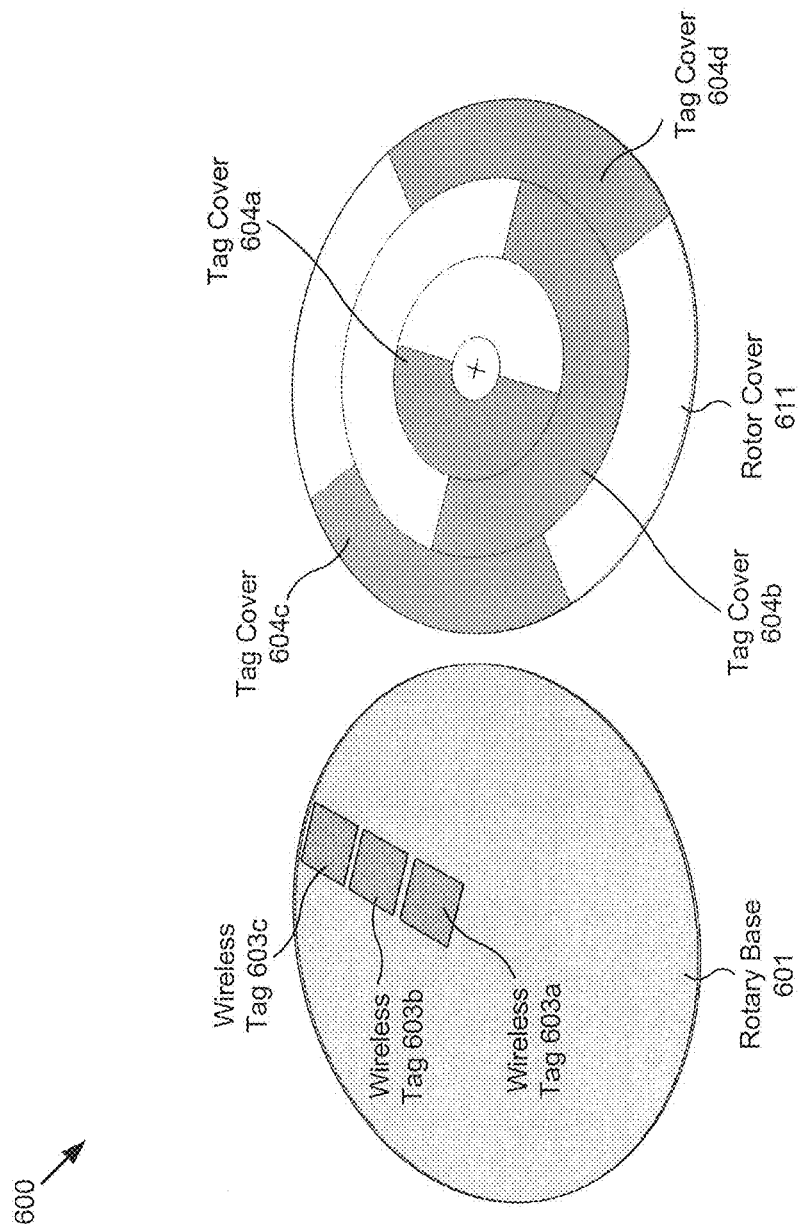
FIG. 6 shows a diagram of exemplary implementations of a rotary encoder including wireless tags and tag covers for use with the system of FIG. 1, according to one implementation of the present disclosure.

FIG. 6 shows a diagram of exemplary implementations of a rotary encoder including wireless tags and tag covers for use with the system of FIG. 1, according to one implementation of the present disclosure. Diagram 600 shows rotary base 601, including wireless tag 603a, wireless tag 603b, and wireless tag 603c, and rotary cover 611, including tag cover 604a, tag cover 604b, tag cover 604c, and tag cover 604d. Tag covers 604a-604d may be configured on rotary cover 611 to create a reflected binary code (RBC), which is a binary numeral system where two successive values differ in only one bit (binary digit). Alternate configurations of a rotary encoder may place n tags radially from the center of rotary base 601 and use rotary cover 611 and a plurality of tag covers cut into an n-bit circular RBC pattern. A rotary encoder with n tags will have $2^n$ states. Executable code 140 may be estimate the state by sampling the cover state of each of the n tags—each subset of covered tag states corresponds to a unique encoder state.

Figure 7:
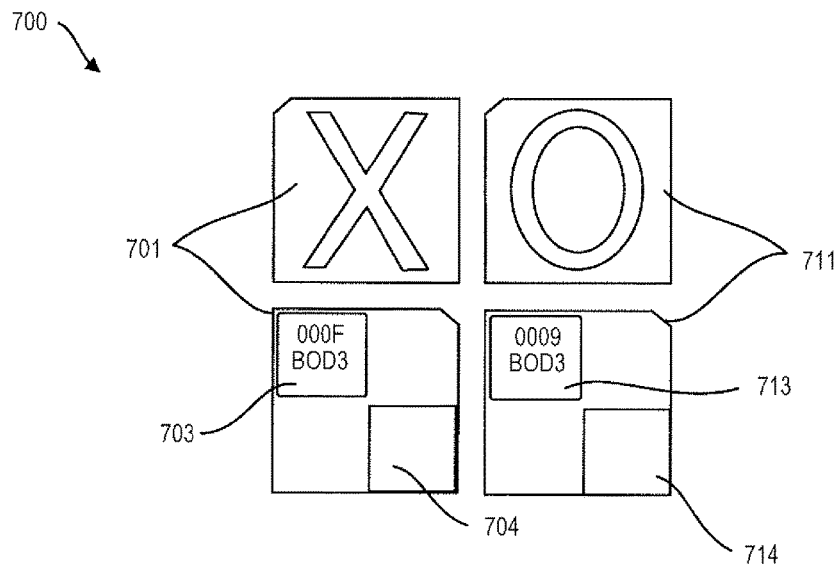
FIG. 7 shows a diagram of two exemplary game pieces including wireless tags and tag covers, according to one implementation of the present disclosure.

FIG. 7 shows a diagram of two exemplary game pieces including wireless tags and tag covers, according to one implementation of the present disclosure. Diagram 700 shows game piece 701 and game piece 711. Game piece 701 is an X insert for a game of Tic-tack-toe and includes wireless tag 703 and tag cover 704. Game piece 711 is an O insert for the Tic-tack-toe game and includes wireless tag 713 and tag cover 714. Game pieces 701 and 711 may be inserted into a game board for playing Tic-tack-toe.

Figure 8:
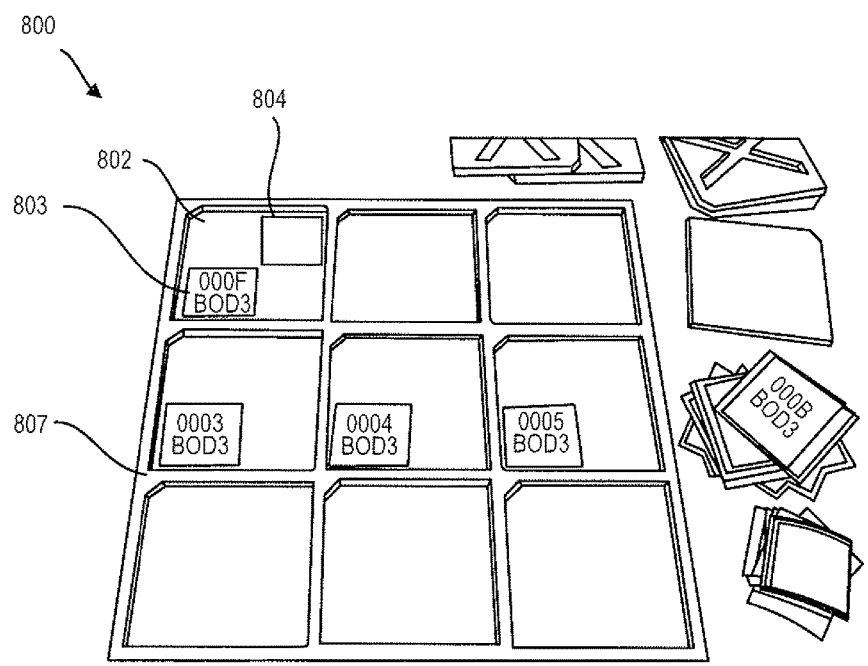
FIG. 8 shows a diagram of an exemplary game board including wireless tags and tag covers for use with the game pieces of FIG. 7, according to one implementation of the present disclosure.

FIG. 8 shows a diagram of an exemplary game board including wireless tags and tag covers for use with the game pieces of FIG. 7, according to one implementation of the present disclosure. Diagram 800 shows game board 807 including nine game slots arranged in a 3×3 grid. Each slot in game board 802 includes a wireless tag, as illustrated by wireless tag 803, and a tag cover, as illustrated by tag cover 804. When a player inserts game piece 701 into game slot 802, tag cover 804 covers wireless tag 703, and tag cover 704 covers wireless tag 803 and may cause wireless tag 703 and wireless tag 803 to substantially reduce the rate at which they respond to interrogation signals transmitted by wireless tag reader 105. Based on the simultaneous reduction in responses, executable code 140 may update the tag states of wireless tag 703 and wireless tag 803 to "covered." In some implementations, executable code 140 may update the interaction state of game board 807 to include game piece 701 in game slot 802, and the interaction state of game piece 701 as being played in game slot 802.

Figure 9:
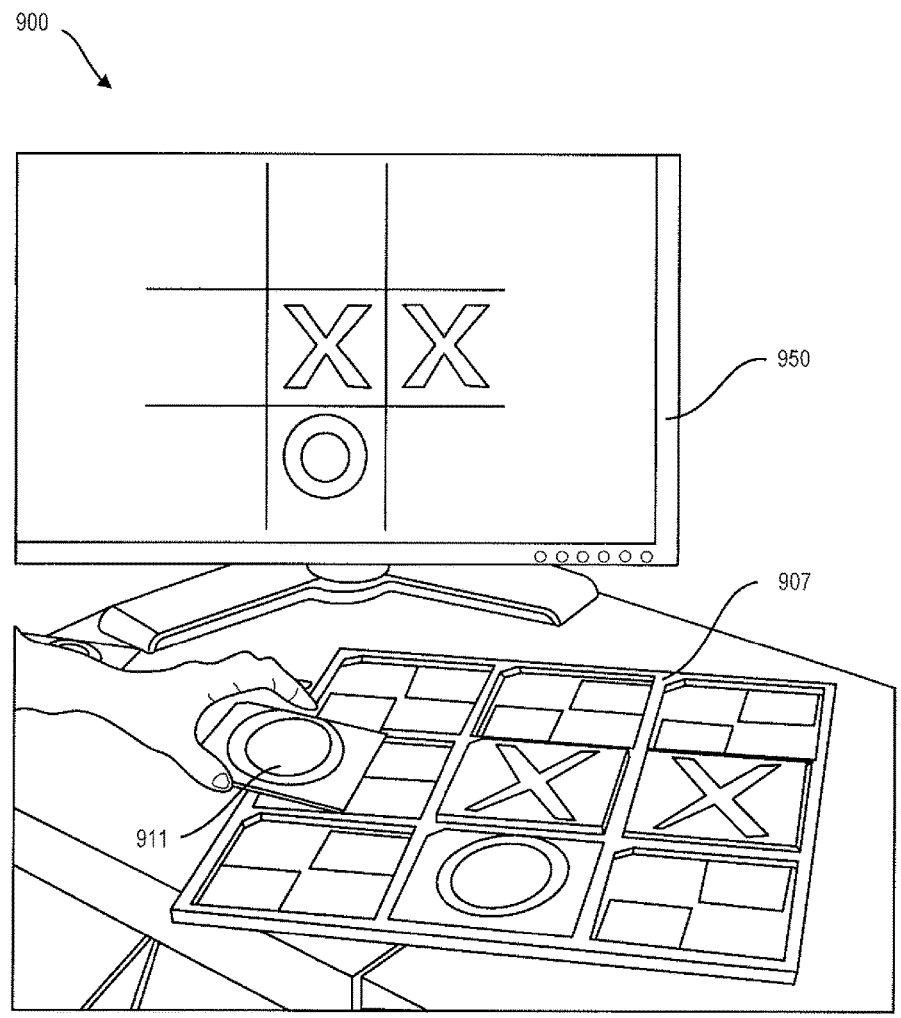
FIG. 9 shows a diagram of an exemplary game board including wireless tags and tag covers and a display showing a digital representation of the game, according to one implementation of the present disclosure.

FIG. 9 shows a diagram of an exemplary game board including wireless tags and tag covers and a display showing a digital representation of the game, according to one implementation of the present disclosure. Diagram 900 shows game board 907 including a plurality of game pieces that have been played, game piece 911, and display 950. Game board 907 includes a plurality of game pieces that have been played in game slots. Game piece 911 is being placed in a game slot of game board 907. Display 950 shows a current game state including a graphic representation of game board 907 and the game pieces that have been placed therein.

Figure 10B:
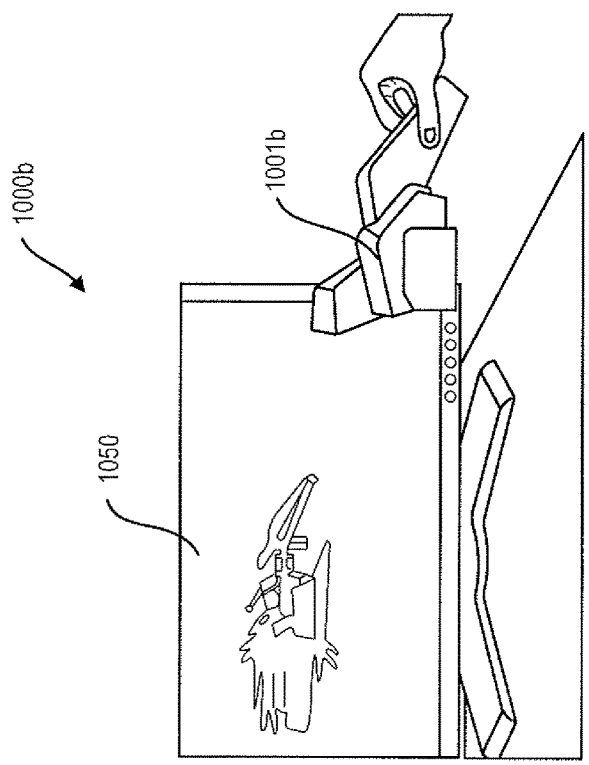
FIG. 10*b* shows a diagram of the exemplary toy of FIG. 10*a* and a game that is controlled by the toy, according to one implementation of the present disclosure.
Figure 10A:
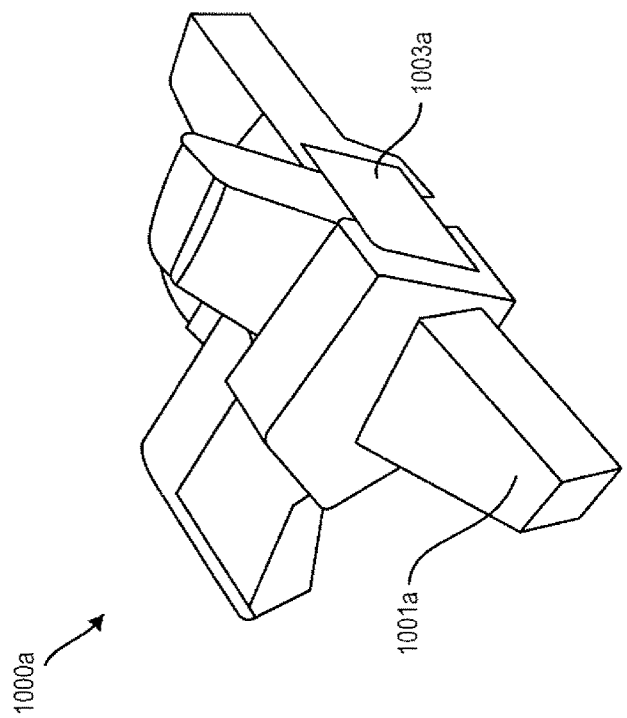
FIG. 10*a* shows a diagram of an exemplary toy including a wireless tag, according to one implementation of the present disclosure.

FIG. 10a shows a diagram of an exemplary toy including a wireless tag, according to one implementation of the present disclosure. Diagram 1000a shows object 1001a with wireless tag 1003a attached to object 1001a. In some implementations, object 1001a may be used as a controller for a video game. Executable code 140 may interpret the motion state of object 1001a as an input for a video game. For example, when object 1001a is moved by a user, executable code 140 may interpret the motion state as input to accelerate a spaceship in a video game. If the user were to stop moving object 1001a, executable code 140 may interpret the motion state as input to stop accelerating the spaceship in the video game. FIG. 10b shows a diagram of the exemplary toy of FIG. 10a and a game that is controlled by the toy, according to one implementation of the present disclosure. Diagram 1000b shows object 1001b and display 1050. As shown in FIG. 10b, a user is shaking object 1001b, and display 1050 shows a spaceship accelerating in space.

Figure 11:
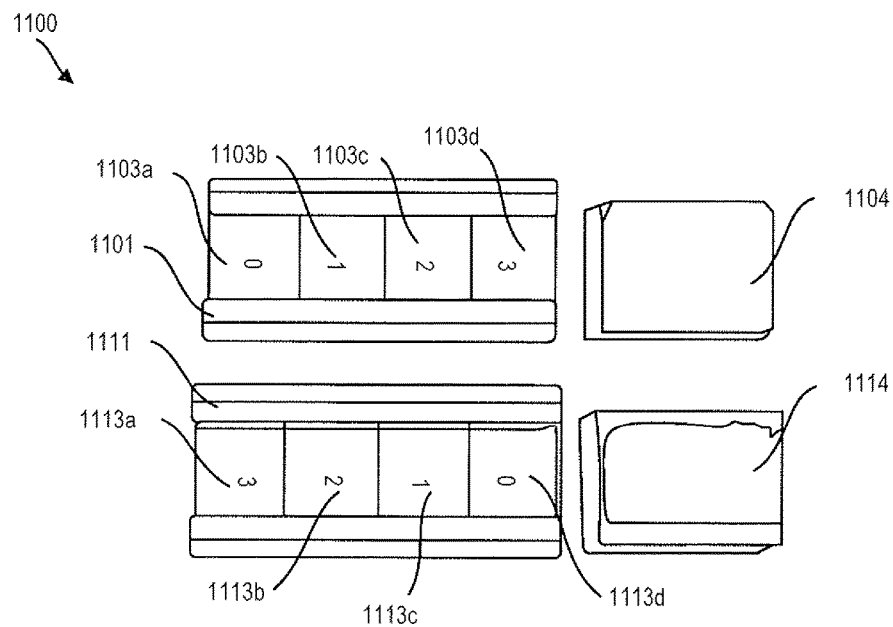
FIG. 11 shows a diagram of two exemplary sliders including wireless tags and tag covers, according to one implementation of the present disclosure.
Figure 12:
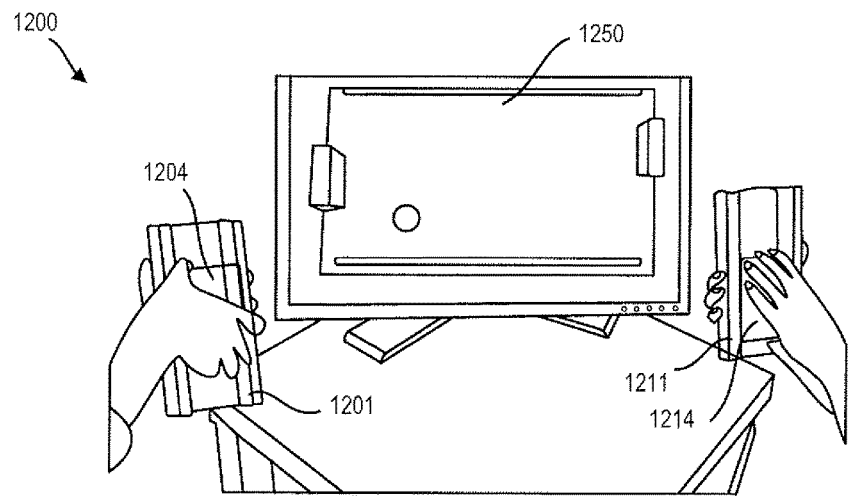
FIG. 12 shows a video game controlled by the sliders of FIG. 11, according to one implementation of the present disclosure.

FIG. 11 shows a diagram of two exemplary sliders including wireless tags and tag covers, according to one implementation of the present disclosure. Diagram 1100 shows slider 1101, including wireless tag 1103a, wireless tag 1103b, wireless tag 1103c, and wireless tag 1103d, with slider cover 1104, and slider 1111, including wireless tag 1113a, wireless tag 1113b, wireless tag 1113c, and wireless tag 1113d, with slider cover 1114. In some implementations, sliders 1101 and 1111 with slider covers 1104 and 1114 may be used as input devices to control a video game, such as the classic video game Pong. Slider 1101, when used with slider cover 1104, may have six states, including no wireless tags covered, only wireless tag 1103a covered, wireless tags 1103a and 1103b covered, wireless tags 1103b and 1103c covered, wireless tags 1103c and 1103d covered, and only wireless tag 1103d covered. Slider 1111 and slider cover 1114 similarly have six states. In some implementations, executable code may also distinguish when a wireless tag is partially covered, such as when slider 1104 covers part of wireless tag 1103a, all of wireless tag 1103b, and part of wireless tag 1103c, allowing for more interaction states for slider 1101 or slider 1111. FIG. 12 shows a video game controlled by the sliders of FIG. 11, according to one implementation of the present disclosure. Diagram 1200 shows users controlling a video game using slider 1201 with slider cover 1204 and slider 1211 with slider cover 1214 to play a video game. Display 1250 shows the current game state, as determined by executable code 140.

Figure 13:
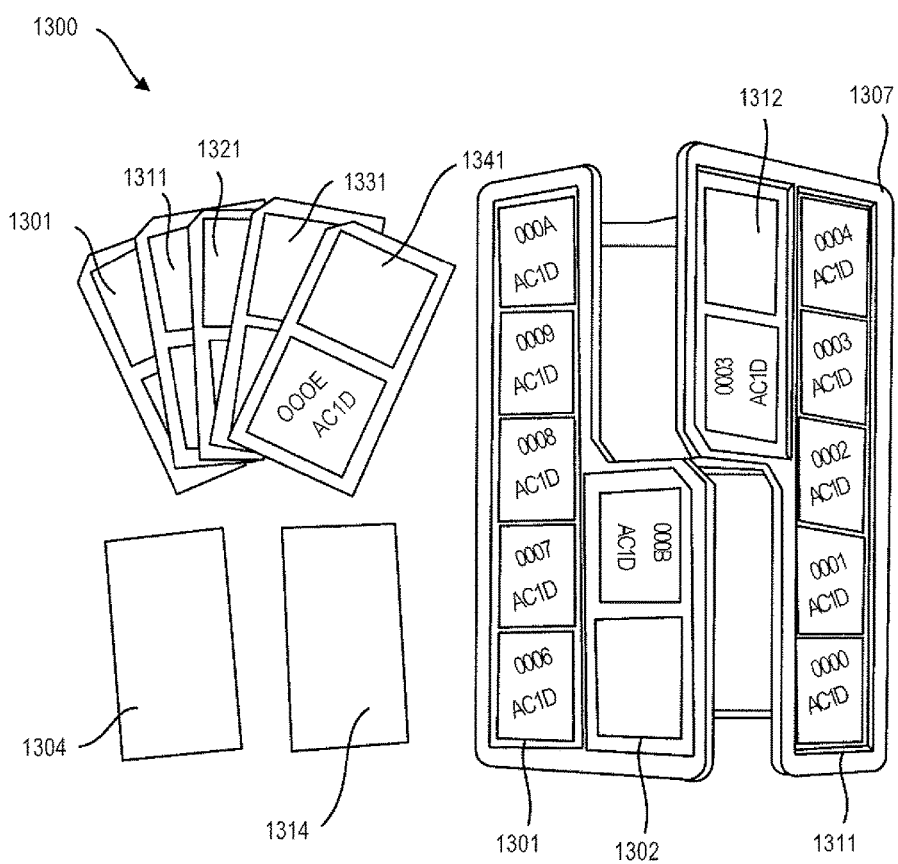
FIG. 13 shows a plurality of exemplary wireless tags and tag covers for use with a control device including sliders and slots for receiving the wireless tags and covers, according to one implementation of the present disclosure.

FIG. 13 shows a plurality of exemplary wireless tags and tag covers for use with a control device including sliders and slots for receiving the wireless tags and covers, according to one implementation of the present disclosure. Diagram 1300 shows insert 1301, insert 1311, insert 1321, insert 1331, insert 1341, slider cover 1304, slider cover 1314, and control device 1307 including slider 1301, slot 1302, slider 1311, and slot 1312. Each of inserts 1301-1341 has a wireless tag and tag cover, and each of slots 1302 and 1312 include a wireless tag and tag cover, and each of sliders 1301 and 1311 include four wireless tags. In some implementations, control device may be used as a controller for selecting up to two inputs using slots 1302 and 1312, such as selecting two audio tracks, and adjusting an aspect of the selected inputs using sliders 1301 and 1311, such as the volume of one or both audio tracks. For example, a user may select two audio tracks by inserting insert 1301 into slot 1302 to select a first audio track, and insert 1341 into slot 1312 to select a second audio track. Executable code 140 may update the interaction states of tags 1301 and 1341 to indicate that they have been inserted into slots 1302 and 1312, respectively. In some implementations, executable code 140 may search wireless tag EPC database 135 to determine a first audio track associated with the EPC of insert 1301 and a second audio track associated with the EPC of insert 1341. The user may then adjust the playback volume of the first audio track using slider cover 1304 in slider 1301, and the playback volume of the second audio track using slider cover 1314 in slider 1311.

Figure 14:
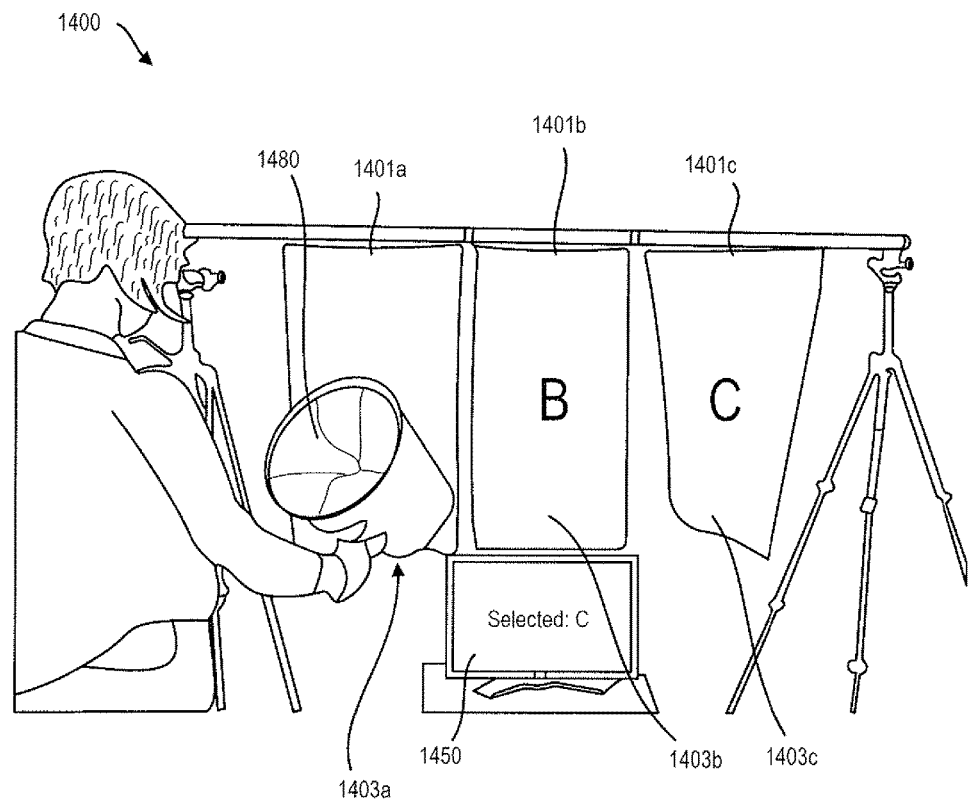
FIG. 14 shows an exemplary interactive selection game using the system of FIG. 1, according to one implementation of the present disclosure.

FIG. 14 shows an exemplary interactive selection game using the system of FIG. 1, according to one implementation of the present disclosure. Diagram 1400 shows flag 1401a, flag 1401b, and flag 1401c having wireless tag 1403a (obscured by vortex cannon 1480), wireless tag 1403b, and wireless tag 1403c, respectively, display 1450, and vortex cannon 1480 held by a user. The user may be asked a question, such as a multiple choice trivia question, and may select an answer by launching a puff of air at one of the flags, each flag corresponding to one of the multiple choice answers. Wireless tag reader 105 may measure the motion of each wireless tag 1403a-1403c and determine which flag, if any, the user has selected by detecting the motion of the wireless tag attached to flag corresponding to the selected answer. Tag state module 141 may determine the tag state of wireless tag attached to the selected flag is in motion, and interaction state module 143 may confine the selection when one wireless tag has sufficiently high probability of a having a significantly high velocity. User feedback module 145 may display the selected answer on display 1450.

Figure 15:
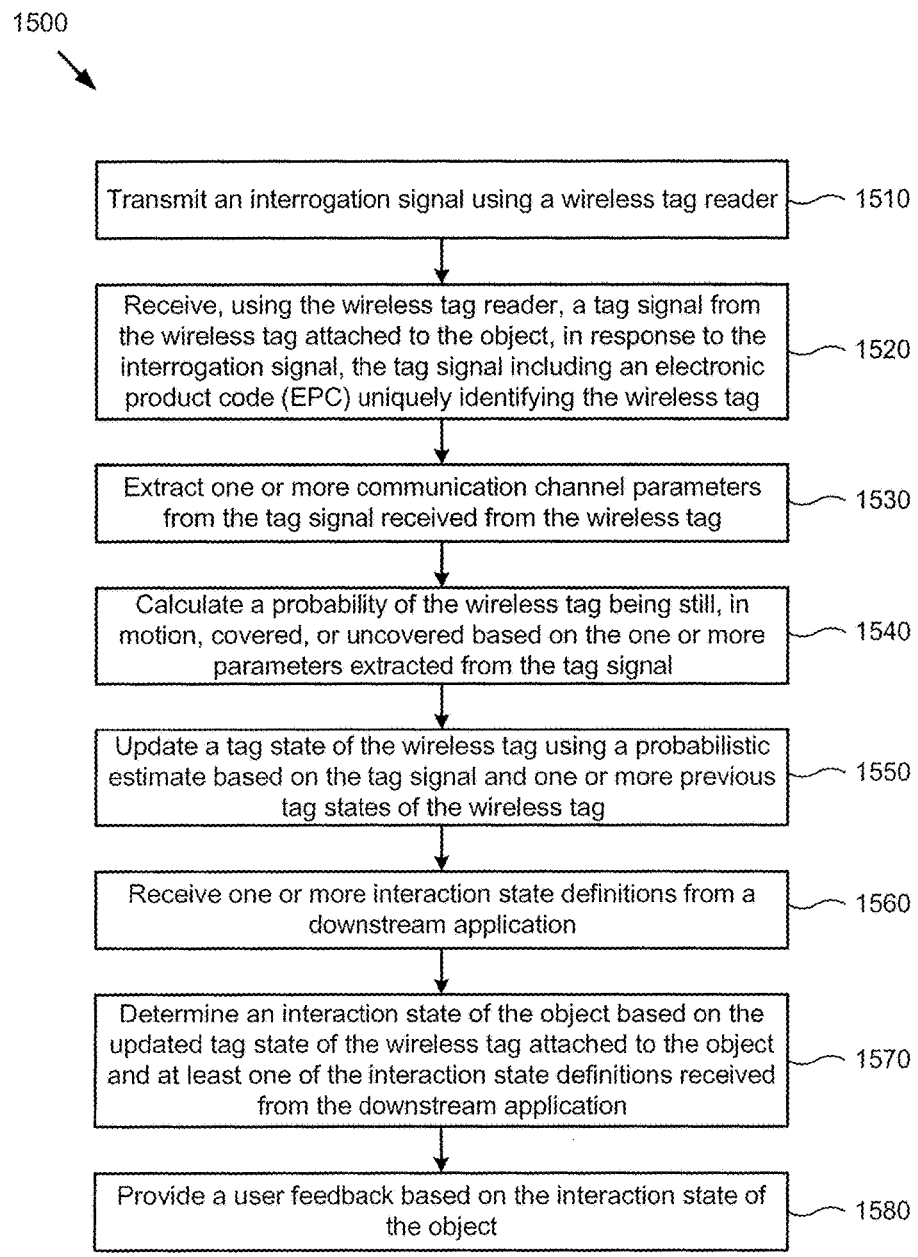
FIG. 15 shows a flowchart illustrating an exemplary method of determining interaction states of wireless tags based on probability distributions, according to one implementation of the present disclosure.

FIG. 15 shows a flowchart illustrating an exemplary method of determining interaction states of wireless tags based on probability distributions, according to one implementation of the present disclosure. Method 1500 begins at 1510, where executable code 140 transmits an interrogation signal using wireless tag reader 105. The interrogation signal may be an RF signal, a WiFi signal, a BT or BLE signal, etc. Method 1500 continues at 1520, where executable code 140 receives, using wireless tag reader 105, a tag signal from wireless tag 103 attached to object 101, in response to the interrogation signal, the tag signal including an EPC uniquely identifying the wireless tag. In some implementations, the tag signal may be an authentication reply transmitted by wireless tag 103. The authentication reply may be a signal that is backscattered by wireless tag 103, such as a backscattering of the interrogation signal.

In some implementations, wireless tag reader 105 may inventory a plurality of wireless tags, including wireless tag 103. Wireless tag 103 may be a passive wireless tag and transmit information by reflecting the interrogation signal transmitted by wireless tag reader 105. In some implementations, wireless tag 103 may selectively change the RF reflectivity based on energy wireless tag 103 receives from the interrogation signal. Wireless tag reader 105 may measure the reflected interrogation signal to receive information from wireless tag 103. To avoid redundancies, wireless tag reader 105 may proceed in a series of rounds, where, in each round, wireless tag reader 105 repeatedly allocates a number of response slots, and interrogates all wireless tags for which wireless tag reader 105 has not yet received a reply to reply in one of these slots. Once no more tags reply, wireless tag reader 105 may start a new round of interrogations.

At 1530, executable code 140 extracts one or more communication channel parameters from the tag signal received from wireless tag 103. In some implementations, wireless tag reader 105 may be capable of reporting channel parameters such as RSSI, RF phase, and Doppler shift, as well as the EPC of each tag and a timestamp of the tag read. For example, to retrieve the data streams including the channel parameters extracted from the received signal, system 100 may utilize a reader communication software in C# using Octane SDK provided by IMPINJ®. In some implementations, the channel parameters reported by wireless tag reader 105 may represent a unique signature of the RF environment of wireless tag 103. Each time a tag is read, wireless tag reader 105 may measure these physical layer channel parameters and report them along with the wireless tag EPC and the transmit frequency to executable code 140. By observing changes in these parameters over time, inferences can be made about the state of wireless tag 103 and thus object 101, to which wireless tag 103 is attached.

RSSI is a measurement of the signal power received at wireless tag reader 105 and may be predominantly affected by changes in the distance between wireless tag 103 and wireless tag reader 105. In some implementations, changes in RSSI may be predominantly caused by changes in the distance between wireless tag reader 105 and wireless tag 103 as well as the orientation of wireless tag 103. However, it is well known that multipath effects can cause unpredictable variations in signal strength between a transmitter and receiver. In real-world settings, multipath increases the spatial variation in RSSI and thus providing a greater likelihood of detecting motion events. Executable code 140 may identify changes in Standard Deviation of RSSI, Mean of RSSI Standard Deviation within each frequency, and Mean of difference between neighboring RSSI to detect motion events using RSSI.

RF phase is a measure of the phase angle between the RF carrier transmitted by wireless tag reader 105 and the return signal from the tag. RF phase may be affected by small changes in distance between wireless tag 103 and wireless tag reader 105 and/or in carrier frequency, and may repeat every wavelength. RF phase may be sensitive to smaller changes in distance between the wireless tag 103 and wireless tag reader 105 and may be particularly useful for detecting translational motion. Since wireless tag reader 105 performs many tag reads on a single frequency before hopping to the next channel, changes in the RF phase may be a good indicator of an interaction event.

Read rate of wireless tag 103 may be the number of times each second that wireless tag reader 105 is able to read wireless tag 103, such as the number of packets received from wireless tag 103 per second. A cover event on wireless tag 103 may significantly weaken the received signal strength, which may result in a decreased read rate. For example, read rate of wireless tag 103 when uncovered may range from 15 to 40 reads per second, while the read rate when wireless tag 103 is partially or fully covered may be less than about 10 reads per second. The read rate of wireless tag 103 may be used to determine whether wireless tag 103 is covered or uncovered. Doppler shift may be the frequency shift between the signal transmitted by wireless tag reader 105 and a reflected signal, and may be caused by quickly moving objects. Doppler shift may be used in a number of radio sensing scenarios to infer the relative motion of wireless tag 103 and wireless tag reader 105.

At 1540, executable code 140 calculates a probability of wireless tag 103 being still, in motion, covered, or uncovered based on the one or more parameters extracted from the tag signal. Executable code 140 may maintain a probabilistic estimate of the tag state of wireless tag 103, including whether wireless tag 103 is covered and how fast wireless tag 103 is moving. As tag state module 141 receives tag-read information, executable code 140 may update the probabilistic distributions of the tag state of wireless tag 103 using a Bayes filter. A Bayes filter is a procedure that, given a system evolving over time and a sequence of observations $z_i$, estimates the distribution of possible current states, $z_i$. This distribution, $bel(x_i) \equiv p(x_i|z_{1:i})$, is known as the current belief. The belief at step i−1 is used to estimate the belief at step i recursively:

$$\overline{bel}(x_i) = \int_{x_{x-1}} p(x_i|x_{i-1}) bel(x_{i-1}) \quad (1)$$

$$bel(x_i) \propto p(z_i|x_i) \overline{bel}(x_i) \quad (2)$$

Equation 1 and equation 2 may account for the change in system state over time using a transition model prior, $p(x_i|x_{i-1})$; this updated belief $\overline{bel}(x_i)$) is then re-weighted using an observation model $p(z|x)$. The $\propto$ notation used in Equation (2) indicates that normalization may be required after this step.

Wireless tag reader 105 may most easily read wireless tag 103 when wireless tag 103 is uncovered, e.g., when there is no conductive material, such as a piece of metal foil, or dielectric material, such as a hand, very close to wireless tag 103. When wireless tag 103 is uncovered, wireless tag 103 may respond to an interrogation signal transmitted by wireless tag reader 105 at a higher rate than when wireless tag 103 is covered, in part or in whole. When wireless tag reader 105 transmits an interrogation signal, tag state module 141 may interpret responses from wireless tag 103 as an indication that wireless tag 103 is not covered, and tag state module 141 may interpret a lack of response from wireless tag 103 to the interrogation signal as an indication that wireless tag 103 is covered.

The state space for tag cover is binary: $x_i \in \{visible, covered\}$. The corresponding (visibility) Bayes filter may operate on a distribution represented by a single value $v_i \equiv P(x_i = visible)$. The transition function is straightforward: given elapsed time t, the expected next visibility $\overline{v}_i$ may be computed from the previous visibility $v_i-1$ by decaying toward a uniform distribution:

$$\overline{v}i = \frac{1}{2} + \frac{1}{2^{t/h}}\left(v_{i-1} - \frac{1}{2}\right) \quad (3)$$

where h sets the half-life of the decay. Executable code 140's default value of h is 1 second. In some implementations, executable code may allow an application developer to override this value.

In some implementations, executable code 140 may build an observation model based on the elapsed time t between subsequent tag reads. To estimate the probability densities p(t|visible) and p(t|covered), executable code 140 may be trained on two sets of observations. For p(t|visible), executable code 140 may record the time between reads when wireless tag 103 is uncovered and is one of a plurality of wireless tags in a sample population. The tag reads corresponding to wireless tag 103 may be randomly distributed among the tag reads of the sample population, and the time between reads may increase with larger sample populations. For p(t|covered), executable code 140 may record the time between reads when wireless tag 103 is at least partially covered with aluminum foil and is one of a plurality of wireless tags in a sample population. When wireless tag 103 is covered, the tag read latency for wireless tag 103 may have a large variance and mean, e.g., two (2) seconds.

In some implementations, executable code 140 may approximate the p(t|visible) and p(t|covered) training distributions as Gaussian distributions:

$$t_{visible} \sim N^+(\mu_v(m), \sigma_v^2(m)) \quad (4)$$

$$t_{covered} \sim N^+(\mu_c, \sigma_c^2) \quad (5)$$

For the data collected when wireless tag 103 is covered, both the mean and variance of the Gaussian may have a strong linear correlation with the tag population size, e.g., $R^2$ with mean: 0.92, $R^2$ with standard deviation: 0.9072. For the data collected when wireless tag 103 is covered, the mean and variance may be mostly flat, resulting in a parametric distribution for visible wireless tags in the sample tag population size, m. Equations 4 and 5 use the notation $N^+$ to indicate that executable code 140 discards the negative portion of each Gaussian and normalizes the remainder.

The transition and observation models may serve to update the Bayesian visibility belief for each tag whenever a new tag read is received. In some implementations, executable code 140 may rely on the visibility distribution between tag reads in order to update an interaction state of wireless tag 103. In this case, executable code 140 may use an observation model that takes an integral over the read latency distribution to estimate the probability of having not read the tag for t seconds:

$$P(\text{no\_read\_for\_}t|visible) \propto 1 - \int_0^t N^+(\mu_v(m), \sigma_v^2(m)) dt \quad (6)$$

$$P(\text{no\_read\_for\_}t|covered) \propto 1 - \int_0^t N^+(\mu_c, \sigma_c^2) dt \quad (7)$$

Executable code 140 represents the velocity of wireless tag 103 relative to wireless tag reader 105 by a normal distribution, and updates the mean, μ, and standard deviation, α, as follows. Executable code 140 models velocity as being influenced by a normally-distributed acceleration over time t:

$$N(\overline{\mu}_i, \overline{\sigma}_i^2) = N(\mu_{i-1}, \sigma_{i-1}^2) + N(0, at) \quad (8)$$

where a may have a default value of 1 m/s. In some implementations, executable code may allow an application developer to override this value.

In some implementations, the phase of the reflected interrogation signal may be proportional to the path length between wireless tag 103 and wireless tag reader 105, e.g., modulo the wavelength of the signal. Thus, given two subsequent reads separated by t seconds and a tag velocity of V, executable code 140 may observe a phase difference of $$\Delta\phi = \frac{2tV}{\lambda} + N \quad (9)$$

where wavelength λ=c/f can be computed from the frequency of the carrier wave and the speed of light, with noise $N \sim N(0, 0.1\pi^{-2})$. From this equation, executable code 140 may compute the observation model $p(\Delta\phi|V)$.

In some implementations, wireless tag reader 105 may employ carrier frequencies in the 900-930 MHz range, thus transmitting interrogation signals having a wavelength of approximately 32 cm. However, wireless tag reader 105 may only be able to determine phase φ up to a half-wavelength, so the velocity of any object that moves more than 8 cm between reads, approximately 2 m/s, may be underestimated. At 1550, executable code 140 updates a tag state of wireless tag 103 using a probabilistic estimate based on the tag signal and one or more previous tag states of wireless tag 103. In some implementations, executable code 140 may update the tag state of wireless tag 103 based on the tag state determined at 1540.

At 1560, executable code 140 receives one or more interaction state definitions from a downstream application. The downstream application may be a separate application or an application or a supplemental application, such as a plug-in application that may be used with a web browser. In some implementations, interaction state module 143 may receive one or more interaction state definitions to apply to wireless tag 103. In some implementations, the interaction state definitions may be used to describe an interaction state of a system, for example, a game. In some implementations, the application developer may extend an Application class, having a primary purpose of serving as the driver class and containing the Interactions. In some implementations, the application developer may optionally specify additional functionality to run atop the Interaction sub-processes.

In some implementations, the Application may handle any necessary interfacing with hardware. In addition to managing tag reads, this may include changing tag masks. Tag masks, which are a feature of the RFID protocol, allow readers to electively query tag subpopulations, called the masked population. This may allow the application developer to create an application with an arbitrarily large number of wireless tags, among which a small subset of the wireless tags may be read at any given time. In some implementations, Applications may implement a main program loop. The program loop may accept wireless tag inputs, pass the wireless tag inputs off to interactions for an update, and calls any necessary display functions of Interactions. In some implementations, an application developer may extend the Interaction class to create sub-processes which run in an Application. Each Interaction is responsible for maintaining a distribution over possible Interaction States, and updating those states.

At 1570, executable code 140 determines an interaction state of object 101 based on the updated tag state of wireless tag 103 attached to object 101 and at least one of the interaction state definitions received from the downstream application. Based on previous tag states and the current tag state, tag state module 141 may determine a user interaction with object 101. For example, if a tag state was previously moving with a positive velocity for a short time, then with a negative velocity, and the current tag state indicates positive velocity again, interaction state module 143 may determine that the interaction state of wireless tag 103 is shaking.

Interaction states for may vary from one implementation to another. For example, when the system is applied to a game of Tick-tac-toe, each game piece and game slot may have an interaction state indicating whether each game piece has not been played, is currently being played, or has already been played. The game board may have an interaction state for each game slot indicating whether it has been played, and if it has, whether the game piece played in the game slot is an X or an O. In an implementation where object 101 is a controller for a video game, interaction states may include various interaction states describing the motion of object 101, such as the speed, direction, and/or changes in velocity, with various interaction states corresponding to different input control signals for the video game.

Interaction states are more descriptive of what wireless tag 103 is doing, as compared to the tag state which describes an instantaneous tag state, the interaction state of wireless tag 103 includes previous tag states and the current tag state of wireless tag 103 and may infer a user interaction with wireless tag 103 from the tag states of wireless tag 103. In some implementations, such as when object 101 is a game piece, interactions state module 143 may consider previous tag states and a current tag state of wireless tag 103, along with previous interaction states of wireless tag 103, to determine the current interaction state of wireless tag 103. For example, object 101 may have had a sequence of tag states in which wireless tag 103 was still, then in motion, and is currently still again. Additionally, wireless tag 103 may have been uncovered while wireless tag 103 was initially still and in motion, but is now covered, as probabilistically determined by tag state module 141. Interaction state module 143 may consider this information and determine based on the probability distribution of the interaction state of wireless tag 103, that, when wireless tag 103 was initially still and uncovered, the interaction state was that wireless tag 103 had not yet been played in the game. When wireless tag 103 was in motion, interaction state module 143 may determine that wireless tag 103 was being played in the game. Based on the previous tag states and interaction states of wireless tag 103, tag interaction module 143 may determine, based on a probability distribution of possible interaction states for wireless tag 103, that wireless tag 103, currently still and covered, has an interaction state of being played in the game.

In some implementations, executable code 140 may include a deterministic interaction state update rule that uses sampling to approximate the distribution of possible interaction states. Executable code 140 may determine an interaction state of wireless tag 103 by providing a sampling budget q, a starting state $r_0$, and an update function $u(r,i,t) \rightarrow r'$ which, given a current interaction state r and a sample i drawn from the current joint tag state distribution, along with an elapsed tune t, may be used to determine an updated state sample. This function does not need to reason about probability distributions or weights, as it takes as input only concrete samples, rather than distributions. A typical update function may be used to implement a finite-state controller for an interactor.

For every current interaction, executable code 140 may maintain a population of states R, which executable code 140 may update at every time-step in Monte Carlo fashion by applying u to q sampled inputs and states, as shown in Algorithm 1.

---

Algorithm 1 The update loop run for every interaction.

function UPDATELOOP(q, $r_0$, u)
    $R_0 \leftarrow \{r_0\}$
    $k \leftarrow 0$
    while InteractionIsRunning do
        $t \leftarrow$ ElapsedTime( )
        for i = 1 to q do
            $r_i' \leftarrow u(\text{SampleStates}(R_k), \text{SampleInput}(I_k), t)$
        end for
        $R_{k+1} \leftarrow \{r_i'\}$
        $k \leftarrow k + 1$
    end while
end function

---

In some implementations, the solution determined using this method may be scalable: updates among samples can occur in embarrassingly parallel fashion, where little or no effort is needed to separate the problem into a number of parallel tasks. This means that although $R_k$ approximates the true distribution, q can be increased and the approximation thus improved simply by adding more CPU or GPU cores to hardware processor 120.

In some implementations, an application developer may choose to specify a post-update function that is called after every update step. This function may examine the current interaction state distribution and may update summary statistics, terminate the interaction, or even modify the sample population. One such post-update function that we have found convenient terminates the interaction and dispatches an event whenever an "final" interaction state accounts for more than a proportion p of the total pool of states.

At 1580, executable code 140 provides a user feedback based on the interaction state of objects 101. In some implementations, user feedback module 145 may play an audio over a speaker to communicate game state information to the user, such as the beginning of a game, the beginning of the user's turn, the end of the user's turn, the end of the game, etc. For example, in a game of Tick-tack-toe, user feedback module 145 may play an audio indicating the beginning of a game based on the tag states of one or more game pieces and/or one or more game slots. After the first player has played a game piece, user feedback module 145 may play an audio indicating the beginning of the opposing player's turn. User feedback module 145 may continue to notify the players of the beginning of each player's turn until one player wins the game, at which point user feedback module 145 may play an audio announcing the game is won, or reaches a draw, at which point user feedback module 145 may play an audio announcing the game has ended in a draw. In other implementations, user feedback module 145 may display information for a user on a display, such as a game state, game information, e.g., a trivia question or the user's selected response, an action in a game occurring in response to a user's input, etc.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
a wireless tag reader;
a wireless tag attached to an object;
a non-transitory memory storing an executable code and a probability distribution of previous tag states of the wireless tag determined based on previous user interactions with the wireless tag;
a hardware processor executing the executable code to:
transmit, using the wireless tag reader, an interrogation signal;
receive, using the wireless tag reader, a tag signal from the wireless tag attached to the object, in response to the interrogation signal, the tag signal including an electronic product code (EPC) uniquely identifying the wireless tag;
use the tag signal received from the wireless tag to probabilistically determine a current tag state of the wireless tag using the probability distribution of the previous tag states of the wireless tag; and
determine an interaction state of the object based on the current tag state of the wireless tag attached to the object;
wherein the current tag state is indicative of a tag covered state of the wireless tag.

2. The system of claim 1, wherein the hardware processor further executes the executable code to:
provide a user feedback based on the interaction state of the object.

3. The system of claim 2, wherein the user feedback includes at least one of an audio feedback and a visual feedback.

4. The system of claim 1, wherein the hardware processor applies a Bayes filter to the tag signal to determine the current tag state.

5. The system of claim 1, wherein the tag signal includes one of a response to the interrogation signal transmitted by the wireless tag reader and a lack of a response to the interrogation signal transmitted by the wireless tag reader.

6. The system of claim 1, wherein the tag covered state is one of the wireless tag being covered and the wireless tag being uncovered.

7. The system of claim 1, wherein the object is one of a game piece, a game board, a slider track, a slider cover, and a rotary encoder.

8. The system of claim 1, wherein the interaction state of the object is based on an interaction definition.

9. The system of claim 8, wherein the interaction definition is received from an application.

10. The system of claim 1, wherein the hardware processor executes the executable code to update the probability distribution using the current tag state.

11. A method for use with a system including a wireless tag reader, a non-transitory memory storing a probability distribution of previous tag states of a wireless tag determined based on previous user interactions with the wireless tag, and a hardware processor, the method comprising:
transmitting, using the wireless tag reader, an interrogation signal;
receiving, using the wireless tag reader, a tag signal from the wireless tag attached to an object in response to the interrogation signal, the tag signal including an electronic product code (EPC) uniquely identifying the wireless tag;
using the tag signal received from the wireless tag to probabilistically determine a current tag state of the wireless tag using the probability distribution of the previous tag states of the wireless tag; and
determining, using the hardware processor, an interaction state of the object based on the current tag state of the wireless tag attached to the object;
wherein the current tag state is indicative of a tag covered state of the wireless tag.

12. The method of claim 11, further comprising:
providing, using the hardware processor, a user feedback based on the interaction state of the object.

13. The method of claim 12, wherein the user feedback includes at least one of an audio feedback and a visual feedback.

14. The method of claim 11, wherein the hardware processor applies a Bayes filter to the tag signal to determine the current tag state.

15. The method of claim 11, wherein the tag signal includes one of a response to the interrogation signal transmitted by the wireless tag reader and a lack of a response to the interrogation signal transmitted by the wireless tag reader.

16. The method of claim 11, wherein the tag covered state is one of the wireless tag being covered and the wireless tag being uncovered.

17. The method of claim 11, wherein the object is one of a game piece, a game board, a slider track, a slider cover, and a rotary encoder.

18. The method of claim 11, wherein the interaction state of the object is based on an interaction definition.

19. The method of claim 11 further comprises updating the probability distribution using the current tag state.

* * * * *